United States Patent
Lien et al.

(10) Patent No.: US 12,417,028 B2
(45) Date of Patent: Sep. 16, 2025

(54) DYNAMIC ERASE OPERATION SELECTION USING ERASE POLICY

(71) Applicant: Micron Technology, Inc., Boise, ID (US)

(72) Inventors: Yu-Chung Lien, San Jose, CA (US); Zhenming Zhou, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/439,318

(22) Filed: Feb. 12, 2024

(65) Prior Publication Data

US 2024/0281145 A1  Aug. 22, 2024

Related U.S. Application Data

(60) Provisional application No. 63/486,136, filed on Feb. 21, 2023.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,127,467 | B1* | 9/2021 | Wang | G11C 11/5635 |
| 2014/0269090 | A1* | 9/2014 | Flynn | G11C 16/14 |
| | | | | 365/185.24 |
| 2021/0043260 | A1* | 2/2021 | Tsuda | G11C 16/16 |
| 2021/0272638 | A1* | 9/2021 | Hou | G11C 16/08 |

* cited by examiner

*Primary Examiner* — Edward J Dudek, Jr.
*Assistant Examiner* — Ralph A Verderamo, III
(74) *Attorney, Agent, or Firm* — NICHOLSON DE VOS WEBSTER & ELLIOTT LLP

(57) ABSTRACT

Methods, systems, and apparatuses include determining an erase policy for a memory device. An erase operation is selected based on the determined erase policy, where the erase operations include an alternating erase operation and a uniform erase operation. The erase operation is executed on a portion of memory.

20 Claims, 4 Drawing Sheets

DYNAMIC ERASE OPERATION SELECTION USING ERASE POLICY

CROSS-REFERENCE TO RELATED APPLICATION

The present application claims the benefit of U.S. Provisional Patent Application No. 63/486,136, filed on Feb. 21, 2023, which is hereby incorporated by reference.

TECHNICAL FIELD

The present disclosure generally relates to erase operation selection, and more specifically, relates to dynamically selecting an erase operation using an erase policy.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
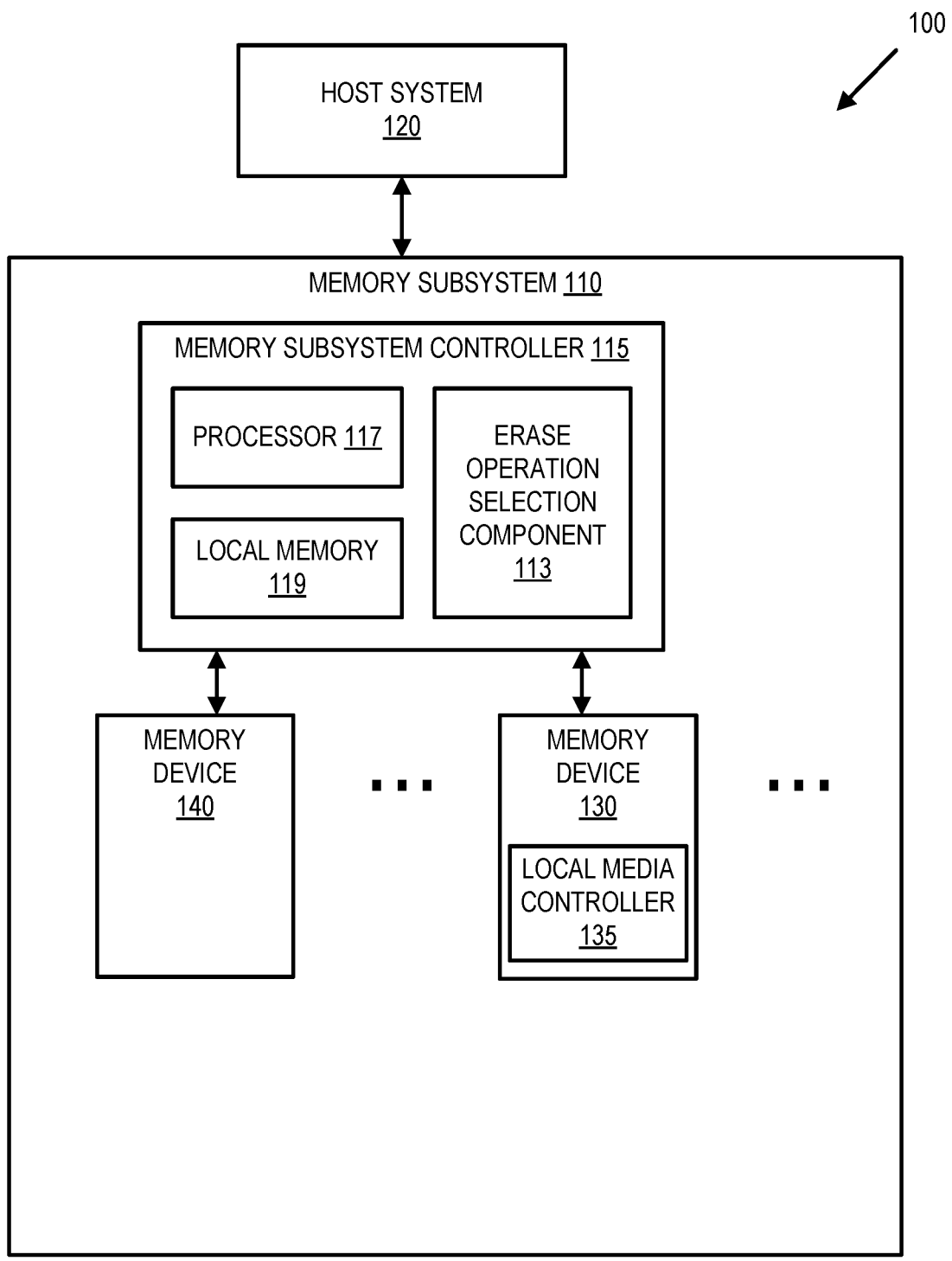
FIG. 1 illustrates an example computing system that includes a memory subsystem in accordance with some embodiments of the present disclosure.

Aspects of the present disclosure are directed to the dynamic selection of an erase operation using an erase policy in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

The logic states in memory cells are differentiated using charge distribution levels. For example, a QLC can be capable of storing sixteen different charge levels, L0 through L15 to represent sixteen different binary values, 0000 through 1111. The data charge level becomes a threshold voltage, such that, when a read reference voltage is applied to a transistor for the memory cell, the transistor will turn on when the read reference voltage is higher than the threshold voltage. Charge gain, also referred to as charge distribution growth and charge migration, is a change in the threshold voltage that can result in a loss in reliability of the state of memory cells. In particular, L0 charge gain for a memory cell in an erased state (e.g., a QLC with a threshold voltage corresponding to storing a binary value of "1111") due to electron injection or hole de-trapping in/from the storage nitride layer can lead to the memory cell appearing to be in a non-erased state (e.g., a threshold voltage corresponding to storing a binary value of "1110").

Advancements in memory cell design (e.g., from floating-gate architecture to replacement-gate architecture) yield improvements, such as improved storage density, write endurance, and latency but have also brought about a greater sensitivity to charge gain. For example, the onset of charge gain can start seconds after erasing a replacement-gate memory cell, compared to a few hours in a floating-gate memory cell. An erased block of memory can become unreliable if not programmed within, e.g., an hour of erasure. Some conventional memory techniques, referred to as erase policies, address the charge gain problem by erasing a memory block only when the memory subsystem receives a request to program data to the memory block. Such approaches, however, can slow system performance because each block's programming time will include the erase time. Conventional memory systems use a single type of erase operation without considering how the erase operations can affect the system performance for specific erase policy implementations.

Aspects of the present disclosure address the above and other deficiencies by dynamically selecting an erase operation using the erase policy and workload. For example, certain erase operations, such as alternating erase operations, inject fewer holes into the memory device and therefore result in better data retention when compared to conventional erase operations (e.g., uniform erase operations). Uniform erase operations apply the same erase voltages to neighboring wordlines whereas alternating erase operations apply erase voltages to alternating wordlines in memory, reducing the fringing field between erase voltage application. Alternating erase operations, however, also take more time to complete than conventional erase operations. By selecting an erase operation based on the erase policy and the workload, the memory subsystem can balance the tradeoffs of erase time and data retention based on the erase policy. For example, erase policies such as erase on demand (EOD) erase memory blocks immediately prior to programming, resulting in the programming time including the erase time. Using erase operations with a longer erase time is therefore not optimal for these erase policies. Other policies, such as just in time erase (JiTE), erase memory blocks in advance of requested programming operations resulting in programming time not including the erase time unless the workload is very busy. Using erase operations with a longer erase time is therefore optimal for these erase policies when the workload permits. As a result of selecting an erase operation using the erase policy and workload, the memory subsystem can optimize system performance while preventing data reliability problems, such as charge gain or RWB gain.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an erase operation selection component 113 that can dynamically select an erase operation to apply using the erase policy and a workload. In some embodiments, the controller 115 includes at least a portion of the erase operation selection component 113. For example, the controller 115 can include a processor 117 (processing device) configured to execute instructions stored in local memory 119 for performing the operations described herein. In some embodiments, an erase operation selection component 113 is part of the host system 120, an application, or an operating system.

The erase operation selection component 113 can select an erase operation, e.g., a uniform erase operation or an alternating erase operation, using the erase policy. Further details with regards to the operations of the erase operation selection component 113 are described below.

Figure 2:
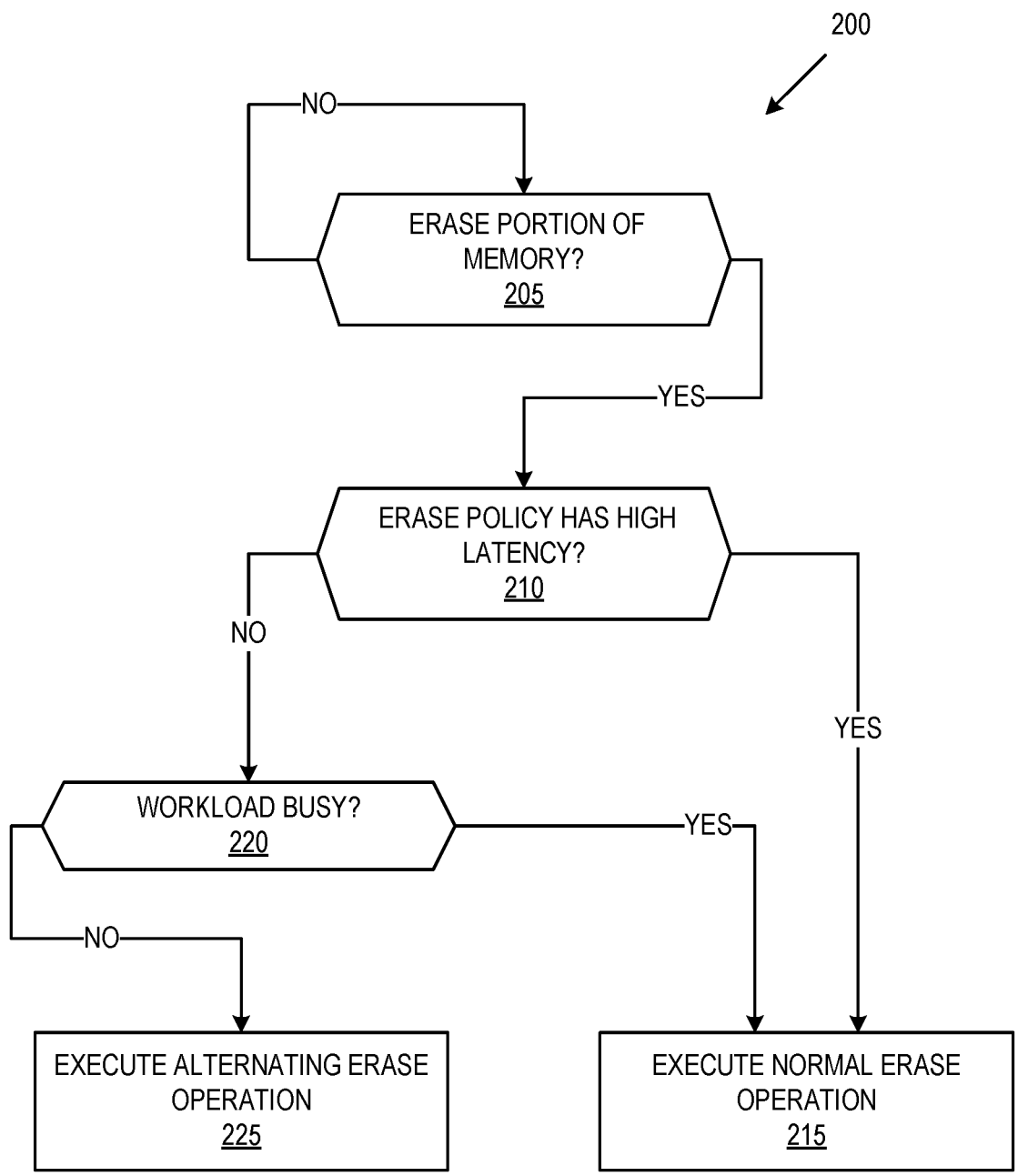
FIG. 2 is a flow diagram of an example method to dynamically select an erase operation using an erase policy in accordance with some embodiments of the present disclosure.

FIG. 2 is a flow diagram of an example method 200 to dynamically select an erase operation using erase policy, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the erase operation selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device determines whether to erase a portion of memory. For example, erase operation selection component 113 determines to erase a portion of memory, such as a portion of memory of memory device 130, in response to receiving a command from host system 120 or as a part of an internal operation, such as garbage collection. In some embodiments, the processing device determines whether/when to erase the portion of memory based on the erase policy. For example, memory subsystem 110 can have different erase policies including an erase on demand (EOD) policy, a just in time erase (JiTE) policy, a free block pool erase (FBP) policy, and/or an erase in advance erase (EIA) policy, among others. Different erase policies can trigger erase operations, e.g., to create free portions of memory for write requests, at different times. For example, memory systems using an EOD policy erase the portion of memory after receiving a command to program the portion of memory (e.g., a write command). EOD policies, therefore, result in low erase retention (ER) and a high write latency (e.g., relative to an erase policy that erases portions of memory in advance of receiving a write command). Memory systems using a JiTE policy use a prediction algorithm to erase the portion of memory prior to receiving the command to program the portion of memory. JiTE policies, therefore, result in a relatively low ER (although typically higher than EOD) and a lower write latency than EOD. JiTE policies, however, use complex prediction algorithms and can essentially become EOD in memory systems with high workloads. Memory systems using a FBP policy erase utilize a free block pool, where portions of memory are erased and placed into a free block pool where they periodically undergo a NAND detect erased page (NDEP) scan to ensure the portions of memory in the free block pool remain erased and execute an erase operation if the portions of memory do not remain erased. FBP policies, therefore, result in higher ER and less write latency than EOD and JiTE. FBP policies, however, require the periodic use of NDEP scans and the following erase operation which results in an increase in charge gain. Memory systems using an EIA policy utilize a free block pool and NDEP scan like FBP policies but use a low stress refresh erase (LSRE) instead of a regular erase operation when NDEP scans fail. EIA policies, therefore, result in higher ER and less write latency, like FBP, while also relieving the charge gain impacts caused by FBP policies (e.g., due to the use of LSRE).

In some embodiments, the erase policy for memory subsystem 110 changes over time. For example, memory subsystem 110 can use an EOD policy until the program erase cycles for memory device 140 satisfies a threshold, at which point memory subsystem 110 changes to an EIA policy.

If the processing device determines that it is time to erase the portion of memory, the method 200 proceeds to operation 210. If the processing device determines that it is not time to erase the portion of memory, the method 200 returns to operation 205.

At operation 210, the processing device determines whether the erase policy is a high latency policy. For example, memory subsystem 110 can use multiple erase policies and associate each with either high or low latency. Erase operation selection component 113 determines which erase policy is currently implemented to determine if the current erase policy is a high latency policy. In some embodiments, erase operation selection component 113 determines that the erase policy is high latency if the erase policy is an EOD policy.

In some embodiments, memory subsystem 110 changes the erase policy to an erase policy with higher ER when the program erase cycles for the memory device satisfy a threshold. Erase operation selection component 113 can therefore check whether the program erase cycles for the memory device satisfy a threshold and determine the erase policy based on this determination. For example, memory subsystem 110 uses an EOD policy until the program erase cycles satisfy a threshold at which point it changes to an EIA policy. Erase operation selection component 113 therefore determines whether the erase policy is EOD or EIA based on whether the program erase cycles satisfy the threshold.

In some embodiments, an indication of the current erase policy is stored in memory, such as local memory 119 and erase operation selection component 113 determines the erase policy by accessing local memory 119. In some embodiments, the erase policy for memory subsystem 110 remains the same and erase operation selection component 113 determines that the erase policy is the default erase policy for memory subsystem 110.

If the processing device determines that memory subsystem 110 is currently using a high latency erase policy, the method 200 proceeds to operation 215. If the processing device determines that memory subsystem 110 is not currently using a high latency erase policy, the method 200 proceeds to operation 220.

At operation 215, the processing device executes a uniform erase operation on a portion of memory. The portion of memory includes even and odd subportions of memory. For example, the portion of memory is a memory block and includes two sets of wordlines, an even set and an odd set. Wordlines in the even set of wordlines only neighbor wordlines in the odd set and vice versa. In other words, the physical layout of the portion of memory is organized such that each set of wordlines therefore includes every other wordline with the even set having an offset of one wordline from the odd set. The even set and odd set together make up the entire memory block. Erase operation selection component 113 executes a uniform erase operation by applying the same erase bias voltage (i.e., a uniform erase volage) to even and odd subportions. For example, erase operation selection component 113 applies a 0.5 volt erase bias voltage concurrently to both even and odd subportions. Because uniform erase operations include only one erase pulse, the total erase time is less than that of an alternating erase operation, which uses more than one erase pulse. Uniform erase operations are therefore used for policies with high latency to reduce the overall write latency when compared with an alternative erase operation. Additionally, as described below, uniform erase operations are used when the workload is busy because write latency can increase for all erase policies when the workload is busy.

Additionally or alternatively to determining if a current erase policy is a high latency erase policy, the processing device selects an erase operation using the bit density of memory cells in the portion of memory. For example, erase operation selection component 113 determines whether the portion of memory contains SLCs, MLCs, TLCs, QLCs, and/or PLCs. If the portion of memory is made up of only SLCs, the processing device executes a uniform erase operation instead of an alternating erase operation. Because SLCs do not suffer from data retention problems to the same degree as, e.g., QLCs, the write latency penalty for an alternating erase operation may not be worth the boost in data retention.

Additionally or alternatively to determining if a current erase policy is a high latency erase policy, the processing device executes a uniform erase operation if it determines that the memory subsystem 110 is operating in a low power mode. For example, erase operation selection component 113 determines whether a current battery level for memory subsystem 110 is below a power level threshold. If the battery level is less than the threshold, erase operation selection component 113 executes a uniform erase operation instead of an alternating erase operation. For example, the increased data retention may not be worth the increased energy consumption of an alternating erase operation in a mobile device with a low battery level.

At operation 220, the processing device determines whether the workload is busy. For example, erase operation selection component 113 determines whether the workload is busy by comparing the command queue depth of a command queue from host system 120 to a workload threshold. The command queue is a queue in memory subsystem 110 that receives commands from host system 120. As memory subsystem 110 executes the commands in the command queue, memory subsystem 110 empties the command queue such that the depth of the command queue represents the number of pending commands for memory subsystem 110 to execute. In some embodiments, the command queue is stored in local memory 119. In some embodiments, the workload threshold is a threshold number of commands in a command queue (e.g., when the command queue is 80% full). Erase operation selection component 113 determines whether the number of commands in the command queue is greater than or equal to the workload threshold. If the determined workload satisfies the workload threshold, erase operation selection component 113 determines that the workload is busy. If erase operation selection component 113 determines that the workload does not satisfy the workload threshold, erase operation selection component 113 determines that the workload is not busy. If the processing device determines that the workload is busy, method 200 proceeds to operation 215 and executes a uniform erase operation as described above. If the processing device determines that the workload is not busy, method 200 proceeds to operation 225.

At operation 225, the processing device executes an alternating erase operation. For example, erase operation selection component 113 executes an alternating erase operation by applying different erase bias voltages to even and odd wordlines in different erase pulses. In one embodiment, erase operation selection component 113 applies a 5 volt erase bias voltage to odd wordlines and applies a 0.5 volt erase bias voltage to even wordlines on a first erase pulse of the alternating erase operation. Erase operation selection component 113 then applies a 0.5 volt erase bias voltage to odd wordlines and applies a 5 volt erase bias voltage to even wordlines on a second erase pulse of the alternating erase operation. Because the processing device uses two erase pulses, an alternating erase operation consumes more time and energy than a uniform erase operation. However, because neighboring wordlines do not simultaneously have high erase bias voltages (e.g., 5 volts in the example above), the fringing field between neighboring wordlines is smaller than in a uniform erase operation (or even nonexistent). There is therefore less lateral charge migration between neighboring wordlines due to fewer holes after programming resulting in better data retention. Since alternating erase operations have better data retention, they are generally preferred over uniform erase operations. However, when a high latency erase policy is used or when the workload for a memory subsystem is busy, uniform erase operations are preferred since they result in less write latency.

Figure 3:
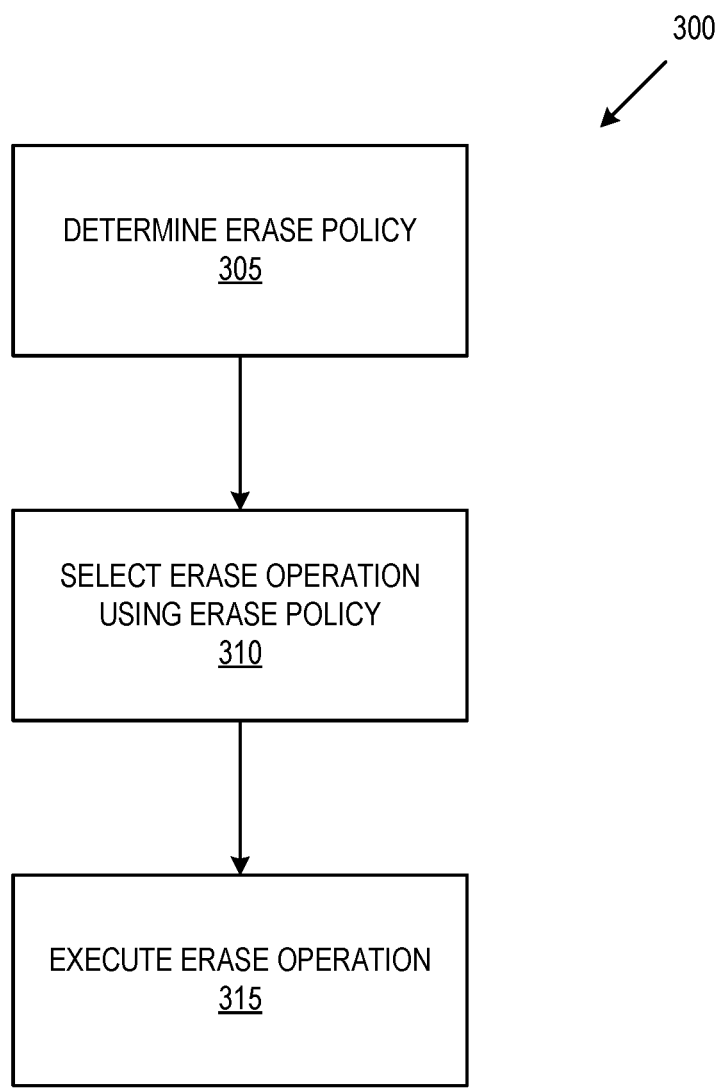
FIG. 3 is a flow diagram of another example method to dynamically select an erase operation using an erase policy in accordance with some embodiments of the present disclosure.

FIG. 3 is a flow diagram of an example method 300 to dynamically select an erase operation using erase policy, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the erase operation selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device determines an erase policy. For example, erase operation selection component 113 determines which erase policy is currently implemented as described above with reference to operation 210. In some embodiments, memory subsystem 110 changes the erase policy to an erase policy with higher ER when the program erase cycles for the memory device satisfy a threshold. Erase operation selection component 113 can therefore check whether the program erase cycles for the memory device satisfy a threshold and determine the erase policy based on this determination. For example, memory subsystem 110 uses an EOD policy until the program erase cycles satisfy a threshold at which point it changes to an EIA policy. Erase operation selection component 113 therefore determines whether the erase policy is EOD or EIA based on whether the program erase cycles satisfy the threshold.

In some embodiments, an indication of the current erase policy is stored in memory, such as local memory 119 and erase operation selection component 113 determines the erase policy by accessing local memory 119. In some embodiments, the erase policy for memory subsystem 110 remains the same and erase operation selection component 113 determines that the erase policy is the default erase policy for memory subsystem 110.

At operation 310, the processing device selects an erase operation using the determined erase policy. For example, erase operation collection component 113 selects a uniform erase operation if the determined erase policy is an EOD policy and selects an alternating erase operation otherwise. In some embodiments, the processing device determines whether the workload is busy. For example, erase operation selection component 113 determines whether the workload is busy by comparing the command queue depth of a command queue from host system 120 to a workload threshold. The command queue is a queue in memory subsystem 110 that receives commands from host system 120. As memory subsystem 110 executes the commands in the command queue, memory subsystem 110 empties the command queue such that the depth of the command queue represents the number of pending commands for memory subsystem 110 to execute. In some embodiments, the command queue is stored in local memory 119. In some embodiments, the workload threshold is a threshold number of commands in a command queue (e.g., when the command queue is 80% full). Erase operation selection component 113 determines whether the number of commands in the command queue is greater than or equal to the workload threshold. If the determined workload satisfies the workload threshold, erase operation selection component 113 determines that the workload is busy. If erase operation selection component 113 determines that the workload does not satisfy the workload threshold, erase operation selection component 113 determines that the workload is not busy. In such embodiments, the processing device selects a uniform erase operation for all erase policies if the workload is busy.

At operation 315, the processing device executes the erase operation. For example, erase operation selection component 113 applies an erase bias voltage to the portion of memory. If the selected erase operation is an alternating erase operation, erase operation selection component 113 applies a first erase pulse with a lower erase bias voltage applied to even numbered subportions of the portion of memory and applies a second erase pulse with a higher erase voltage on the odd numbered subportions, as described above with reference to operation 225. If the selected erase operation is a uniform erase operation, erase operation selection component 113 applies a single/uniform erase pulse with the same erase bias voltage applied to both even and odd numbered subportions, as described above with reference to operation 215.

Figure 4:
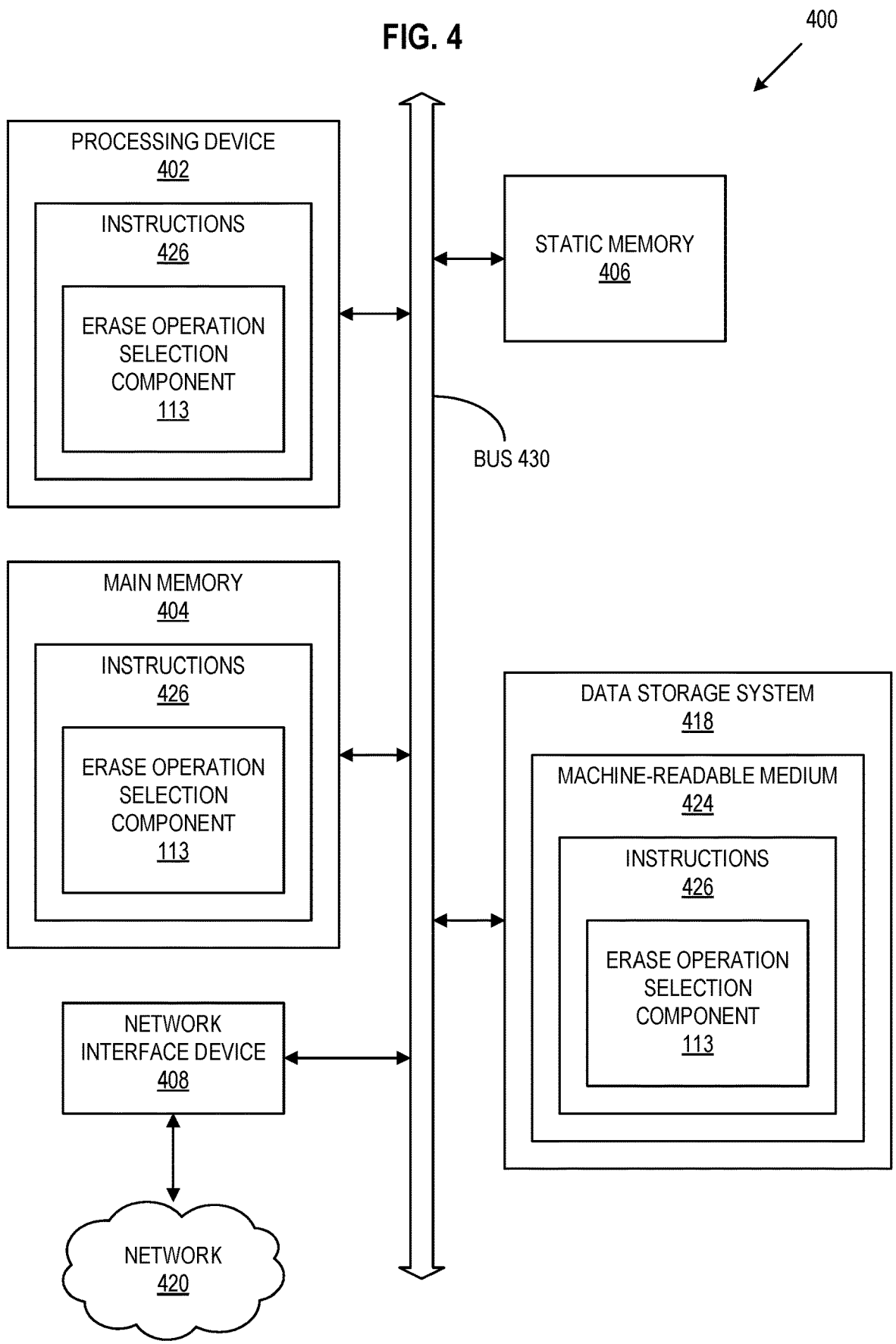
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the erase operation selection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to an erase operation selection component (e.g., the erase operation selection component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining an erase policy of a plurality of erase policies for a memory device, wherein the memory device includes a plurality of portions of memory;
   determining a workload for the memory device;
   selecting an erase operation from a plurality of erase operations using the determined erase policy and the determined workload, wherein the plurality of erase operations comprises an alternating erase operation and a uniform erase operation; and
   executing the erase operation on a portion of memory of the plurality of portions of memory.

2. The method of claim 1, wherein determining the workload includes comparing a command queue depth to a workload threshold.

3. The method of claim 1, the method further comprising:
   selecting the uniform erase operation in response to determining that the workload satisfies a workload threshold.

4. The method of claim 1, the method further comprising:
   selecting the alternating erase operation in response to determining that the workload does not satisfy a workload threshold.

5. The method of claim 4, wherein the portion of memory comprises even numbered subportions and odd numbered subportions, wherein the alternating erase operation comprises at least two erase pulses comprising a first erase pulse and a second erase pulse, and wherein executing the erase operation comprises:
   executing the first erase pulse with a first erase voltage on the even numbered subportions and a second erase voltage on the odd numbered subportions; and
   executing the second erase pulse with the second erase voltage on the even numbered subportions and the first erase voltage on the odd numbered subportions, wherein the first erase voltage is a higher voltage than the second erase voltage.

6. The method of claim 1, the method further comprising:
   selecting the uniform erase operation in response to determining the erase policy has high write latency.

7. The method of claim 1, wherein selecting the alternating erase operation is further in response to determining that the erase policy does not have high write latency.

8. A non-transitory computer-readable storage medium comprising instructions that, when executed by a processing device, cause the processing device to:
   determine an erase policy of a plurality of erase policies for a memory device, wherein the memory device includes a plurality of portions of memory;
   determine a workload for the memory device;
   select an erase operation from a plurality of erase operations using the determined erase policy and the determined workload, wherein the plurality of erase operations comprises an alternating erase operation and a uniform erase operation; and
   execute the erase operation on a portion of memory of the plurality of portions of memory.

9. The non-transitory computer-readable storage medium of claim 8, wherein determining the workload includes comparing a command queue depth to a workload threshold.

10. The non-transitory computer-readable storage medium of claim 8, wherein the processing device is further to:
    select the uniform erase operation in response to determining that the workload satisfies a workload threshold.

11. The non-transitory computer-readable storage medium of claim 8, wherein the processing device is further to:
    select the alternating erase operation in response to determining that the workload does not failing to satisfy a workload threshold.

12. The non-transitory computer-readable storage medium of claim 11, wherein the portion of memory comprises even numbered subportions and odd numbered subportions, wherein the alternating erase operation comprises at least two erase pulses comprising a first erase pulse and a second erase pulse, and wherein executing the erase operation comprises:
    executing the first erase pulse with a first erase voltage on the even numbered subportions and a second erase voltage on the odd numbered subportions; and
    executing the second erase pulse with the second erase voltage on the even numbered subportions and the first erase voltage on the odd numbered subportions, wherein the first erase voltage is a higher voltage than the second erase voltage.

13. The non-transitory computer-readable storage medium of claim 8, wherein the processing device is further to:
    select the uniform erase operation in response to determining the erase policy has high write latency.

14. The non-transitory computer-readable storage medium of claim 8, wherein selecting the alternating erase operation is further in response to determining that the erase policy does not have high write latency.

15. A system comprising:
    a plurality of memory devices; and
    a processing device, operatively coupled with the plurality of memory devices, to:
    determine an erase policy of a plurality of erase policies for a memory device, wherein the memory device includes a plurality of portions of memory;
    determine a workload for the memory device;
    selecting an erase operation from a plurality of erase operations using the determined erase policy and the determined workload, wherein the plurality of erase operations comprises an alternating erase operation and a uniform erase operation; and executing the erase operation on a portion of memory of the plurality of portions of memory.

16. The system of claim 15, wherein determining the workload includes comparing a command queue depth to a workload threshold.

17. The system of claim 15, wherein the processing device is further to:

select the uniform erase operation in response to determining that the workload satisfies a workload threshold.

18. The system of claim 15, wherein the processing device is further to:

select the alternating erase operation in response to determining the erase policy does not have high write latency and in response to determining that the workload does not satisfy a workload threshold.

19. The system of claim 18, wherein the portion of memory comprises even numbered subportions and odd numbered subportions, wherein the alternating erase operation comprises at least two erase pulses comprising a first erase pulse and a second erase pulse, and wherein executing the erase operation comprises:

executing the first erase pulse with a first erase voltage on the even numbered subportions and a second erase voltage on the odd numbered subportions; and executing the second erase pulse with the second erase voltage on the even numbered subportions and the first erase voltage on the odd numbered subportions, wherein the first erase voltage is a higher voltage than the second erase voltage.

20. The system of claim 15, wherein the processing device is further to:

select the uniform erase operation in response to determining the erase policy has high write latency.

* * * * *